United States Patent [19]

Herschler et al.

[11] Patent Number: 4,921,191
[45] Date of Patent: May 1, 1990

[54] ADJUSTABLE WAVEGUIDE/CONDUIT CLAMP

[75] Inventors: Wilbert H. Herschler, Lomita; Stephen R. Nelson, Downey, both of Calif.

[73] Assignee: Rockwell International Corporation, El Segundo, Calif.

[21] Appl. No.: 206,387

[22] Filed: Jun. 14, 1988

[51] Int. Cl.⁵ ................................................ F16L 3/12
[52] U.S. Cl. ...................................... 248/70; 248/74.4
[58] Field of Search ................... 248/70, 73, 56, 316.6, 248/74.1, 74.4, 67.5

[56] References Cited

U.S. PATENT DOCUMENTS

| | | | |
|---|---|---|---|
| 3,133,147 | 5/1964 | Auld, Jr. et al. | 248/74.1 X |
| 4,490,888 | 1/1985 | Levant | 248/74.1 X |

FOREIGN PATENT DOCUMENTS

| | | | |
|---|---|---|---|
| 618602 | 7/1978 | U.S.S.R. | 248/70 |
| 643701 | 1/1979 | U.S.S.R. | 248/70 |
| 1010387 | 4/1983 | U.S.S.R. | 248/74.1 |
| 352114 | 7/1931 | United Kingdom | 248/74.4 |
| 664445 | 1/1952 | United Kingdom | 248/74.1 |

Primary Examiner—Ramon S. Britts
Assistant Examiner—Karen J. Chotkowski
Attorney, Agent, or Firm—Charles T. Silberberg; Harold C. Weston

[57] ABSTRACT

A waveguide/conduit clamp has a load bearing frame with slotted mounting provisions and two mated center rings, an inner circular member with a center cutout to accommodate a waveguide or other conduit member and an outer circular member with a circular cutout displaced from its centerline by a specified offset. Rotation of the outer member, while maintaining orientation of the central one, results in vertical and horizontal displacement of the cutout in the central unit. When proper vertical distance of the cutout is achieved, the clamp is moved in its slotted mounting base to provide final adjusted position of the central member's waveguide/conduit workpiece. Both circular members have slits allowing their placement around the workpiece and within the clamp's load bearing frame.

9 Claims, 2 Drawing Sheets

ADJUSTABLE WAVEGUIDE/CONDUIT CLAMP

ORIGIN OF THE INVENTION

The invention described herein was made in the course of work under a U.S. Government contract and may be manufactured and used by or for the Government without the payment of any royalties thereon or therefor.

BACKGROUND OF THE INVENTION

1. Field of the Invention

This invention relates to adjustable clamps and specifically to a clamp which supports waveguides and precision pneumatic/hydraulic conduit lines in high performance aircraft and spacecraft. It utilizes resilient support members with a workpiece cutout in a central circular element and an eccentric cutout in an outer support member for adjusting the vertical position of the workpiece. Slotted clamp mounting bases allow for any needed horizontal adjustment.

2. Description of the Previous Art

Workpiece clamps and support structure is a "busy" technical art field and a variety of moveable or adjustable support means has come into use over the years. U.S. Pat. Nos. 3,023,990 to A. B. Gunthel Jr. for an ANGULARLY ADJUSTABLE BUS BAR SUPPORT ASSEMBLY, 1,709,898 to D. C. Cunneen (1926 issue) for a PIPE HOLDER OR SUPPORT and 3,146,892 to J. F. Budwich for a UNIVERSAL SWIVEL BEAM CLAMP are just a few of the many support clamp inventions available to the public. All are readily distinguished from the within device.

SUMMARY OF THE INVENTION

Tolerance buildup in aircraft and spacecraft fabrication frequently results in make-work fixes such as shaving off structural components or shimming bracketry to support mounting of precision waveguides and high pressure hydraulic conduits. This invention provides a high quality workpiece support clamp with horizontal and vertical adjustment of workpiece support positions without the need for design alterations or make-work fixes. It allows for rigorous qualification testing of workpiece support means prior to design of tolerance laden critical systems.

Firm, vibration absorbing elastomeric central pieces are provided for both vertical and horizontal displacement of the workpiece involved.

Accordingly, it is an object of the invention to provide a high quality, adjustable waiveguide/conduit support clam which allows for designed positioning of a workpiece in accommodation of tolerance buildups, without the use of shims or structure modifications.

It is another object of this invention to provide a versatile, adjustable workpiece support clamp amenable to qualification testing for high reliability requirements of combat aircraft and spacecraft electronic and pneumatic conduits.

BRIEF DESCRIPTION OF THE DRAWINGS

The concentric adjustable clamp of this disclosure is illustrated in the drawings as support for a rectangularly shaped waveguide. Inner member 11 can be configured to support any shaped item requiring adjustable alignment. In these drawings:

FIG. 4 shows missaligned workpiece waveguides which are reworked into alignment by;

DESCRIPTION OF THE PREFERRED EMBODIMENT

Figure 1:
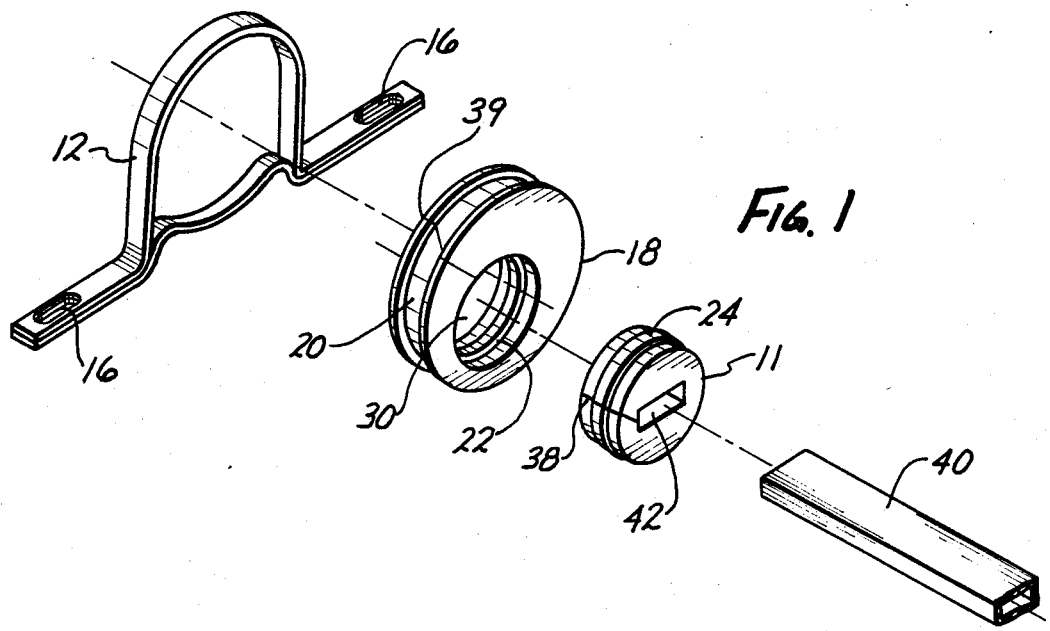
FIG. 1 is an exploded view of one of the embodiments of the invention.
Figure 2:
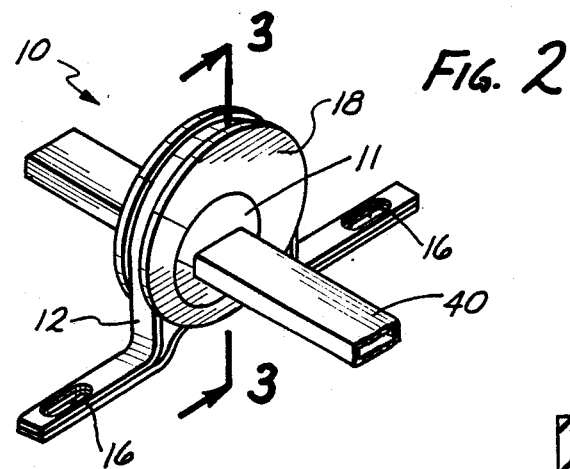
FIG. 2 is a perspective view of the invention supporting a rectangular waveguide.

FIG. 1 shows the major components of clamp 10 to be three in number. They comprise a load bearing structural element (bars 12, 14), generally of stainless steel and in the gauge or thickness found necessary, and two circular support elements 11 and 18. An upper bar 12 is designed to fit snugly in groove 20 of outer circular element 18. A base bar 14 also fits groove 20 and holds circular elements 11 and 18 together against upper bar 12. Base bar 14 generally rests on base structure for reliable load carrying of workpiece 40. (In FIG. 1, workpiece 40 is shown as a rectangular waveguide but any non circulary shaped cutout 39 in element 11 to accommodate other types of functional item is contemplated by this disclosure).

Prototypes of clamp 10 have been fabricated and tested using 302 stainless steel for bars 12, 14 of thickness 0.04 to 0.06 inch thickness and with a radius of curvature 42 ranging from ½ inch to more than 2 inches. Slots 16 are selectable in length, by the designer, to accommodate horizontal tolerance buildup. Lengths of slots 16 in prototype clamps have ranged from small fractions to three quarters of an inch, with full functionality and strength of clamp support present.

Silicone rubber is recommended for fabrication of support elements 18 and 11. Central support element 11 is circular and its diameter is equal to that of space 30 in outer element 18. A ridge 24 on support 11's outer periphery fits snugly into groove 22 of the cutout in element 18. Slit 38 of inner element 11 is made at a convenient angle to allow its placement around workpiece 40. A slit cut at 60 degrees to a centroid of the element has been found to provide good support and reliable gripping for friction control of movement around workpiece 40 and outer element 18.

Support element 11 is circular in shape and of the same diameter as the offset hole 30 in outer element 18. In use, support element 11 is placed around workpiece 40 by opening its shape at slit 38. After placement around workpiece 40, it is placed inside cut 30 of outer support element 18 by use of the same slit 38 distortion of element 18 used to emplace it around workpiece 40. Ridge 24 of support element 11 fits snugly into groove 22 of element 18.

Assembled elements 11, 18 and 40 are positioned over bar 14 with bar 14 in groove 20 of element 18. Bar 14 is moved horizontally over slots 16 to position workpiece 40 in its proper horizontal position.

Figure 6:
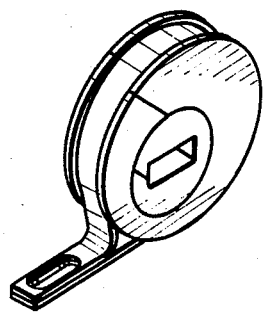
FIG. 6 is a second embodiment of the clamp with a single piece structural support element.

Cutout 30 of outer element 18 is made off center so that it provides a range of vertical support of the base of element 11 from a radius of distance 34 to a maximum height of the distance 32. All heights over the range of 34 to 32 or twice the offset of centerlines of elements 11, 18, can be achieved by rotating element 18 around the outer periphery of element 11. When the desired height is achieved, base bar 14 is moved horizontally to the desired orientation and upper bar 12 is placed over the array and secured to base plate 14 with bolts or screws (not shown). Sufficient tension must be provided by clamping bar 12 to bar 14 to securely hold elements 11 and 18, with their workpiece 40 in a desired stress free mode of the workpiece. Bars 12, 14 could be replaced by a single strap 50 as shown in FIG. 6, with the same provision for vertical and horizontal positioning of a workpiece as is called for above.

Figure 3:
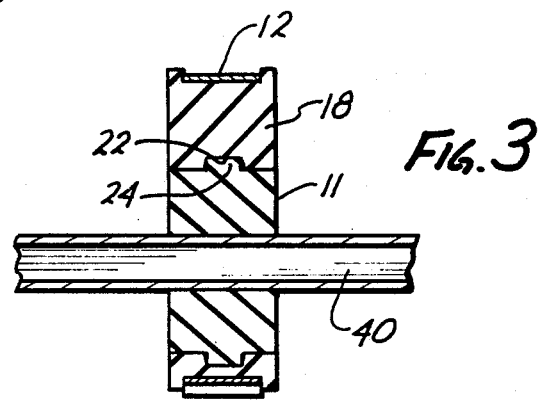
FIG. 3 is a sectional view of the device along the axis of its workpiece.
Figure 4:
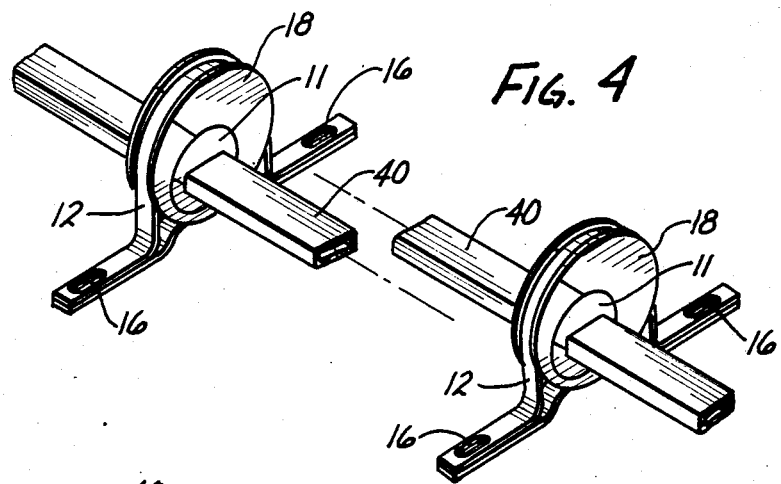
Figure 5:
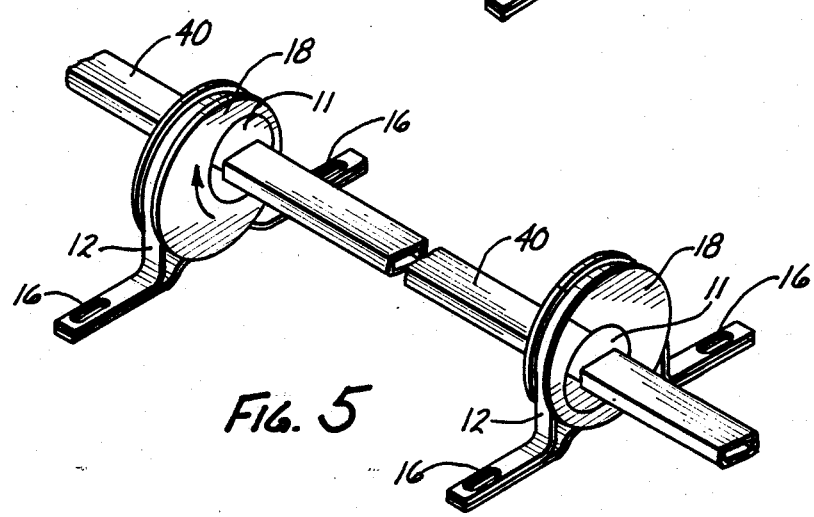
FIG. 5 and clockwise rotation of outer element 18.

In FIG. 3, a ridge 24 of element 11 and slot 22 of element 18 are shown as part of these elements. The purpose of the ridge and slot is to prevent axial movement and separation of items 11 and 18 under vibration.

What is claimed is:

1. A waveguide/conduit support clamp comprising;
   first and second circular support elements and an outer frame having elongated slots in a base portion thereof;
   the first of said circular support elements having a circular cutout of the same diameter as that of the second circular support element;
   said circular cutout being centered along an axis displaced from, but parallel to, the central axis of said first circular support element;
   said second circular support element having a non circular cutout at a center thereof to conform with the periphery of a waveguide/conduit workpiece;
   said second circular support element mounted in the circular cutout of said first circular support element, said first and second support elements mounted in said supporting frame attachable to external structure at said base portion through said elongated slots, said slots allowing for transverse displacement of said frame relative to said central axis.

2. The clamp of claim 1 wherein said first support element is rotatable axially about said second support element so that a workpiece supported in said cutout of said second element is altered in horizontal and vertical position.

3. The clamp of claim 1 wherein said first and second circular support elements are formed of elastomeric materials.

4. The clamp of claim 3 wherein said first and second circular support elements are provided with slits allowing their placement about a workpiece and about each other, with said workpiece in a given, fixed position.

5. The clamp of claim 3 wherein said first and second support elements are provided restraint means to preclude movement of one with respect to the other along an axis perpendicular to said elements.

6. The clamp of claim 1 including restraint means to preclude movement of said first circular support element with respect to said outer frame.

7. The clamp of claim 6 wherein said restraint means comprises a groove in the outer surface of said first circular support element.

8. The clamp of claim 7 wherein said outer frame is comprised of first and second load bearing members, said members being formed to fit snugly in said groove and being coupleable to each other and to external structure via screw means through extended slots at either end of such members.

9. The clamp of claim 7 wherein said supporting outer frame comprises a single load bearing member surrounding said first support member and coupleable to external structure by screw means through an extended slot in said base portion.

* * * * *